Jan. 8, 1963  G. H. RÖHM  3,071,996
LATHE CENTER
Filed April 13, 1959
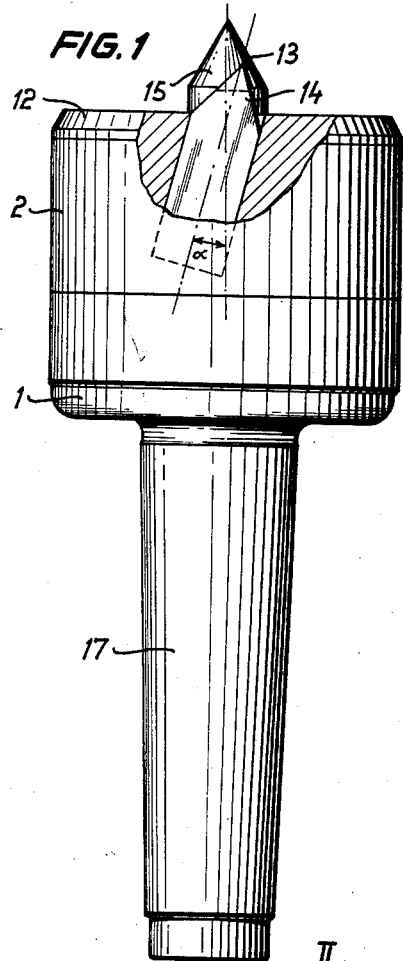
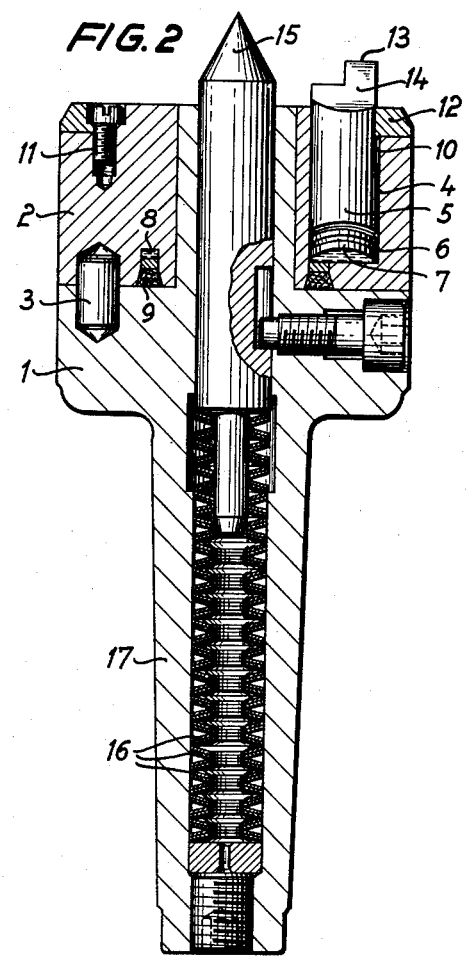
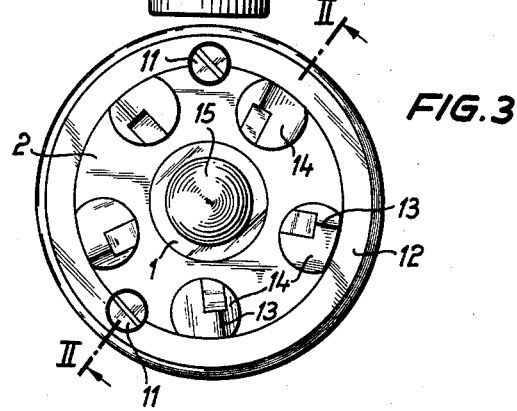
INVENTOR
GUNTER HORST ROHM
BY Larson and Taylor

United States Patent Office 3,071,996
Patented Jan. 8, 1963

3,071,996
LATHE CENTER
Günter Horst Röhm, Muhlstrasse 9, Sontheim (Brenz), Germany
Filed Apr. 13, 1959, Ser. No. 806,071
Claims priority, application Germany Apr. 28, 1958
3 Claims. (Cl. 82—33)

The present invention relates to improvements in lathe centers, and more particularly to a lathe center, the lathe dogs of which are disposed coaxially around the center point.

In the lathe centers known prior to this invention the lathe dogs are mounted either rigidly on a plate on the head of the lathe center or they consist of individual bolts which are mounted in the head of the lathe center concentrically around the center point and are pressed by a pressure medium against the front surface of the workpiece. Each of these lathe dogs has on its outer end a radially extending blade which is adapted to engage with or penetrate into the surface of the workpiece. Since this blade is subjected to a strong lateral pressure during the machining operation, it has already been proposed to make the blade of a saw-tooth shape in order to reduce the danger of its breakage and to improve its engagement with the workpiece. Since the side of such a blade which faces in the direction opposite to the direction of rotation is disposed at a relatively large angle relative to the axis of the bolt forming the individual lathe dog and thus also to the direction of pressure upon the bolt, it is very difficult for the blade to penetrate into the surface of the workpiece. Since hardly any lateral displacement of the material of the workpiece will occur but the action of the blade will be primarily compressive, the contact pressure of the lathe dogs has to be very high.

It is an object of the present invention to provide a lathe center, the bolt-shaped lathe dogs of which are provided with blades, the sides of which extend symmetrically to the longitudinal axis of the individual bolt. A further object of the invention consists in reducing the working pressure of the bolt-shaped lathe dog toward one side within its guiding aperture so that it will require less force to shift the lathe dog in its axial direction, for example, against the action of a compensating pressure medium.

For attaining these objects, the present invention provides the bolt-shaped lathe dogs which are supported by a pressure medium to be inserted into the center head so as to extend at an angle in the direction of the rotation of the lathe center. The contact pressure of the lathe dogs against the workpiece will then be effective in the direction of rotation and the blade of each dog with its sides extending symmetrically to the central axis of the dog will penetrate easily and uniformly into the surface of the workpiece. Consequently, the required contact pressure of the lathe dogs may be made relatively small.

The lathe dogs according to the invention are preferably mounted so as to have a blade angle of approximately 60°, and the axis of each lathe dog is preferably inclined at an angle of approximately 15° relative to the longitudinal axis of the center head.

For mounting the bolt-shaped lathe dogs, they are preferably inserted into a cylindrical ring which is removably mounted on the head of the lathe center and provided with a closed annular chamber containing a pressure fluid on which all of the lathe dogs are supported.

In order to prevent the lathe dogs from falling out of their apertures in the cylindrical supporting ring and for limiting their movement in the forward direction, each of them is provided with a recess into which a ring engages which is secured to the front surface of the cylindrical supporting ring.

These and other objects, features, and advantages of the present invention will be further apparent from the following detailed description of one preferred embodiment of the invention, particularly when read with reference to the accompanying drawings, in which—

FIGURE 1 shows a side view, partly in section, of a lathe center according to the invention;

FIGURE 2 shows a central longitudinal section of the same lathe center wtih some elements shown in perspective; while FIGURE 3 shows a front view thereof.

Referring to the drawings, the lathe center according to the invention consists of a head 1 on which a cylindrical ring 2 is mounted and secured against rotation by means of bolts 3. The cylindrical ring 2 is provided with inclined bores 4 into which the bolt-shaped lathe dogs 5 are slidably inserted. These dogs 5 are supported by pistons 6 which, in turn, act upon a pressure fluid 7 within an annular chamber 8 which connects all of the bores 4 with each other and is closed toward the outside by a ring 9 which is firmly secured in chamber 8, for example, by being soldered therein. Each lathe dog 5 is provided with a lateral recess 10 into which a ring 12 engages which is secured to the head 1 of the lathe center by means of bolts 11. The blades 13 of lathe dogs 5 are likewise recessed and their sides 14 extend symmetrically to the central axis of the dogs 5.

The inclination of lathe dogs 5 and their guiding bores 4 relative to the central longitudinal plane of head 1, shown as α in FIG. 1, amounts to approximately 15° and the blade angle formed by the sides 14 to approximately 60°. However, these angles may also be made larger or smaller depending upon the forces to which the blades are subjected by the working pressure.

The center point 15 is mounted in head 1 in a conventional manner and supported by a set of cup springs 16 which are disposed within the shaft 17 of the lathe center.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A lathe center comprising a head portion having apertures therein, a center point resiliently mounted within said head portion, a plurality of driving dogs resiliently and slidably mounted within said apertures, each of said dogs having a work engaging blade, said apertures and the lathe dogs mounted therein being axially inclined at an acute angle with respect to the axis of said lathe center and in the direction of rotation of said lathe center.

2. A lathe center as defined in claim 1, wherein each of said lathe dogs is disposed at an angle of substantially 15° relative to a plane extending through the longitudinal axis of said head portion.

3. A lathe center as defined in claim 1, wherein each of said lathe dogs has a lateral recess therein, and further comprising a ring engaging into said lateral recesses of all of said lathe dogs for preventing said lathe dogs from falling out of said head portion, and means for securing said ring to said head portion.

References Cited in the file of this patent

UNITED STATES PATENTS

| | | |
|---|---|---|
| 453,617 | Brown | June 9, 1891 |
| 725,439 | Gauch | Mar. 2, 1955 |
| 2,897,708 | Kostyrka | Aug. 4, 1959 |
| 2,909,955 | Williams | Oct. 27, 1959 |
| 2,971,413 | Rohm | Feb. 14, 1961 |

FOREIGN PATENTS

| | | |
|---|---|---|
| 409,864 | Italy | Mar. 5, 1945 |
| 918,480 | Germany | Dec. 13, 1954 |